United States Patent
Mandry et al.

(10) Patent No.: US 10,122,866 B2
(45) Date of Patent: Nov. 6, 2018

(54) AUTOMATED TEST SUITE MECHANISM

(71) Applicants: Stephen Jared Mandry, Longmont, CO (US); Katie Ashley Eng, Boulder, CO (US); David Ward, Broomfield, CO (US)

(72) Inventors: Stephen Jared Mandry, Longmont, CO (US); Katie Ashley Eng, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/256,123

(22) Filed: Sep. 2, 2016

(65) Prior Publication Data

US 2018/0069967 A1    Mar. 8, 2018

(51) Int. Cl.
*H04N 1/00* (2006.01)
*G06F 3/12* (2006.01)

(52) U.S. Cl.
CPC ......... *H04N 1/00031* (2013.01); *G06F 3/123* (2013.01); *G06F 3/1211* (2013.01); *G06F 3/1244* (2013.01); *G06F 3/1248* (2013.01); *G06F 3/1256* (2013.01); *G06F 3/1263* (2013.01); *G06F 3/1282* (2013.01); *H04N 1/00063* (2013.01); *H04N 2201/0094* (2013.01)

(58) Field of Classification Search
CPC .......... H04N 1/00031; H04N 1/00063; H04N 2201/0094; G06F 3/1211; G06F 3/123; G06F 3/1244; G06F 3/1248; G06F 3/1256; G06F 3/1263; G06F 3/1282
See application file for complete search history.

(56) References Cited

U.S. PATENT DOCUMENTS

| 7,375,837 B2 | 5/2008 | Ferlitsch | |
|---|---|---|---|
| 8,368,921 B2 | 2/2013 | Williams | |
| 8,522,214 B2 | 8/2013 | Roth | |
| 8,687,208 B2 | 4/2014 | Nakatsuka | |
| 8,908,209 B2 | 12/2014 | Gaertner et al. | |
| 2004/0190033 A1* | 9/2004 | Ferlitsch | G06F 3/1204 358/1.13 |
| 2006/0050879 A1* | 3/2006 | Iizuka | G06F 21/608 380/51 |
| 2008/0231885 A1* | 9/2008 | Truong | G06F 3/122 358/1.15 |
| 2013/0120774 A1* | 5/2013 | Kouguchi | H04N 1/32128 358/1.9 |
| 2016/0026554 A1* | 1/2016 | Geheb | G06F 11/3688 714/38.1 |

FOREIGN PATENT DOCUMENTS

WO    WO/2009/099808    1/2009

OTHER PUBLICATIONS

Kulkarni, Parikshit, "Exploiting JDF Between Customer and Print-Shop", Helsinki University of Technology, pp. 1-47, 2006.

* cited by examiner

*Primary Examiner* — Iriana Cruz
(74) *Attorney, Agent, or Firm* — Jaffery Watson Mendonsa & Hamilton LLC

(57) ABSTRACT

A method is disclosed. The method includes generating a set of test case tags that describe attributes included in a test case and store the set of test case tags and the test case, receiving input information, and dynamically generating a test suite of one or more test cases based on input attributes data included in the input information, wherein the input information comprises code change information.

15 Claims, 6 Drawing Sheets

```
// @tags Staple, Thickness
bool MaxStapleThicknessMet(int numOfSheets)
{
    if(numOfSheets > 50)
        return true;

+   return false;
}
```

Figure 5A

```
Send Letter_PB_Ledger_20_pg.pdf to the printer and hold the job.
Edit:
    Printing Side - Front Side
Finishing:
    Staple/bind - Perfect binding
    Output tray - Perfect bind lower left tray
    Cover sheet - Manual
        - Ledger weight 5
        - Cover sheet printing side - Outside
Attempt to print the job.
```

Figure 5B

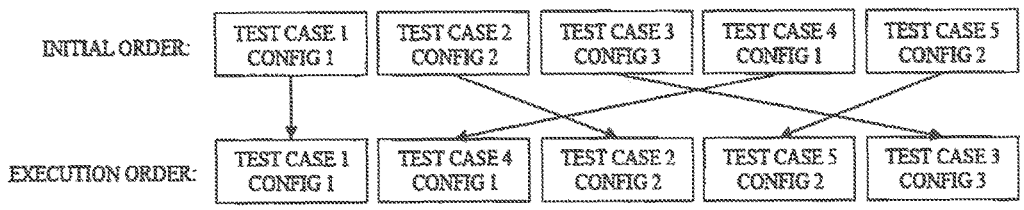

Figure 6

AUTOMATED TEST SUITE MECHANISM

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the field of printing systems, and in particular, to generate test suites for a printing system.

BACKGROUND

In software development, a test suite (or validation suite) is a collection of test cases that are intended to be used to test a software program to show that the program has some specified set of behaviors. A test suite often includes detailed instructions or goals for each collection of test cases, as well as information on the system configuration to be used during testing.

In the field of high-speed production printing, test suites may be used to test code that is implemented to process print jobs. However, such test suites are often handwritten, static, and difficult to adapt to varying situations. Thus, it may take hours (or days) to execute a full regression test suite. Moreover, it is often difficult to organize and order test cases for the most efficient test execution.

Accordingly, an automated test suite generation mechanism is desired.

SUMMARY

In one embodiment, a method is disclosed. The method includes generating a set of test case tags that describe attributes included in a test case and store the set of test case tags and the test case, receiving input information, and dynamically generating a test suite of one or more test cases based on input attributes data included in the input information, wherein the input information comprises code change information.

BRIEF DESCRIPTION OF THE DRAWINGS

A better understanding of the present invention can be obtained from the following detailed description in conjunction with the following drawings, in which:

FIG. 5A illustrates one embodiment of code change information;
FIG. 5B illustrates one embodiment of parsed issue information;
FIG. 6 illustrates one embodiment of reordering job execution order.

DETAILED DESCRIPTION

An automated test suite generation mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
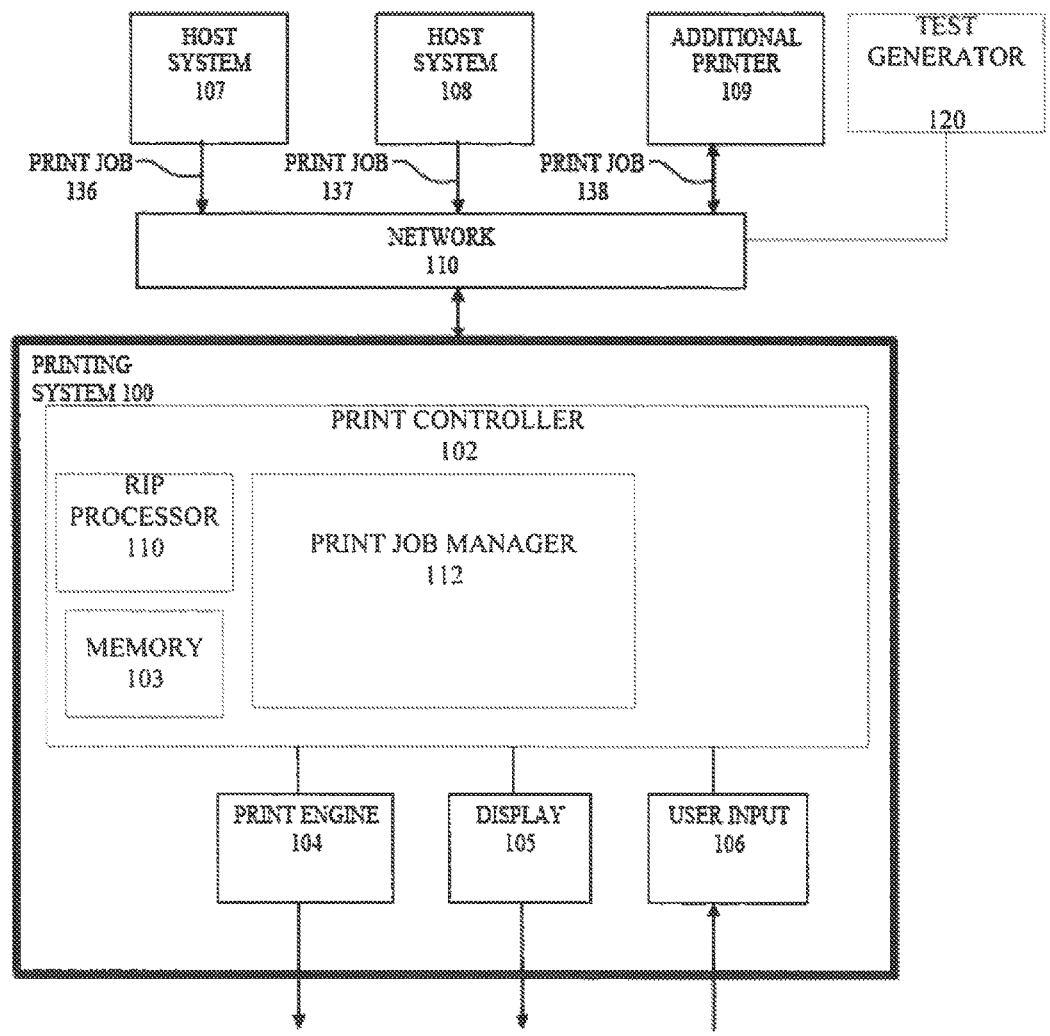
FIG. 1 illustrates one embodiment of a printing system.

FIG. 1 is a block diagram illustrating one embodiment of a printing system 100. Printing system 100 is a system used to provide marks on a media, such as a continuous forms printer or a cut sheet page printer. Printing system 100 may include any digital hardcopy output device, such as printers, copiers, multifunction printers (MFPs) and facsimiles.

In one embodiment, printing system 100 is shared by multiple users. In such an embodiment, printing system 100 includes a print controller 102 and one or more print engines 104. Print controller 102 includes any system, server, or components operable to interface one or more host systems 107 and 108, and a printer 109, via network 110 with one or more print engines 104, and to control the printing of print jobs 136-138 received from the host systems 107 and 108, and a printer 109, respectively, on print engine 104. Print engine 104 provides an imaging process to mark a printable medium, such as paper. In other embodiments, all or portions of printing system 100 may emulate a target printing system. The emulated target printing system may include print engine 104 comprised of hardware and/or software that behaves like the non-emulated target printing system's print engine. One advantage of using emulations is that changing the emulated portion to match a different target printing system may be simpler than otherwise obtaining the non-emulated target printing system.

According to one embodiment, print controller 102 includes memory 103, RIP processor 110 and a print job manager 112. Memory 103 includes any storage system operable to store data. RIP processor 110 performs rasterization to convert print data received in the form of a page description language (PDL) to image bitmap data. In one embodiment, print job manager 112 manages the printing of documents at printing system 100. Particularly, print job manager 112 controls print jobs as they wait to print, arranges the priority of the print jobs, generates separator pages and distributes jobs to the destination print engine 104. In one embodiment, print job manager 112 may be implemented using either InfoPrint Manager (IPM) or InfoPrint ProcessDirector (IPPD), although other types of print job managers may be used instead.

In one embodiment, print job manager 112 holds received print jobs in memory 103 before processing the print job. In such an embodiment, memory 103 stores the print jobs as either a data file or rasterized bitmap file. For example, print jobs stored as rasterized files reduce print time for the held jobs versus those stored as data files. Once stored, each print job may be held until the user that generated the print job retrieves the corresponding document from printing system 100, at which time the print job is processed and printed.

In a further embodiment, a user may release a selected job for printing at printing system 100 via user input 106. Printing system 100 thereby processes the print job by printing via print engine 104. In still a further embodiment, multiple selected print jobs being held for a particular user may be simultaneously processed and printed at print engine 104. Therefore, all print jobs for the same user are printed together when multiple print jobs are released to print.

According to one embodiment, a test generator 120 is coupled to printing system 100 via network 110. In such an embodiment, test generator 120 is implemented to automatically generate test suites from available test cases based on changes to received code. Specifically, test generator 120 may dynamically generate an executable test suite based on attributes. In one embodiment, a user may specify the attributes via a graphical user interface. In other embodiments, the attributes may be specified by a product test, code bug, or issue data created by a tracking tool.

Figure 2:
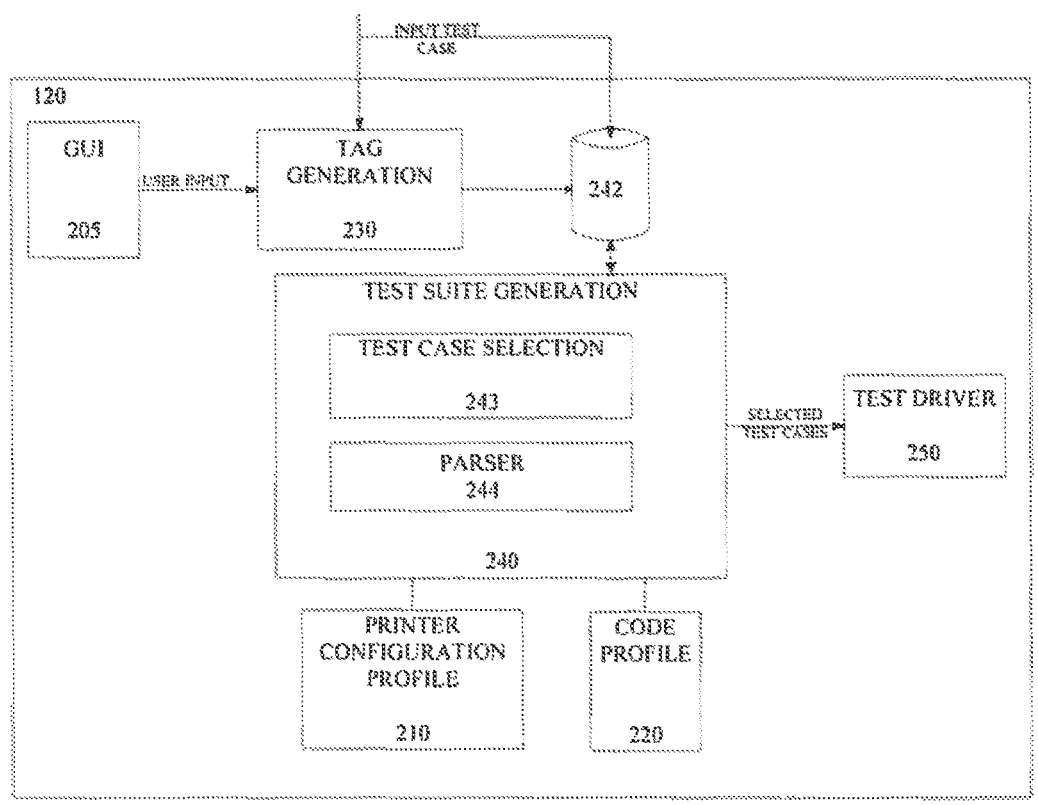
FIG. 2 illustrates one embodiment of a test generator.

FIG. 2 illustrates one embodiment of a test generator 120. Test generator includes graphical user interface (GUI) 205, printer configuration profile 210, code profile 220, tag generation logic 230, test suite generation logic 240 and test driver 250. Printer configuration profile 210 and code profile 220 provide profile information to test suite generation logic 240 regarding the printing system 100 configuration profile and a programming code profile, respectively.

Tag generation logic 230 generates a set of tags that describe properties (or attributes) of corresponding received test cases. According to one embodiment, tag generation logic 230 receives test cases in the form of a job ticket and/or PDL data stream. In such an embodiment, the job ticket is a job definition format (JDF) job ticket and the PDL data stream is in a portable document format (PDF) or PostScript format. However other embodiments may feature different types of job ticket and PDL languages. In even further embodiments, test cases do not require a job ticket. In such embodiments the test cases may only include a PDL, or merely a set of instructions to execute at printing system 100.

Figure 3:
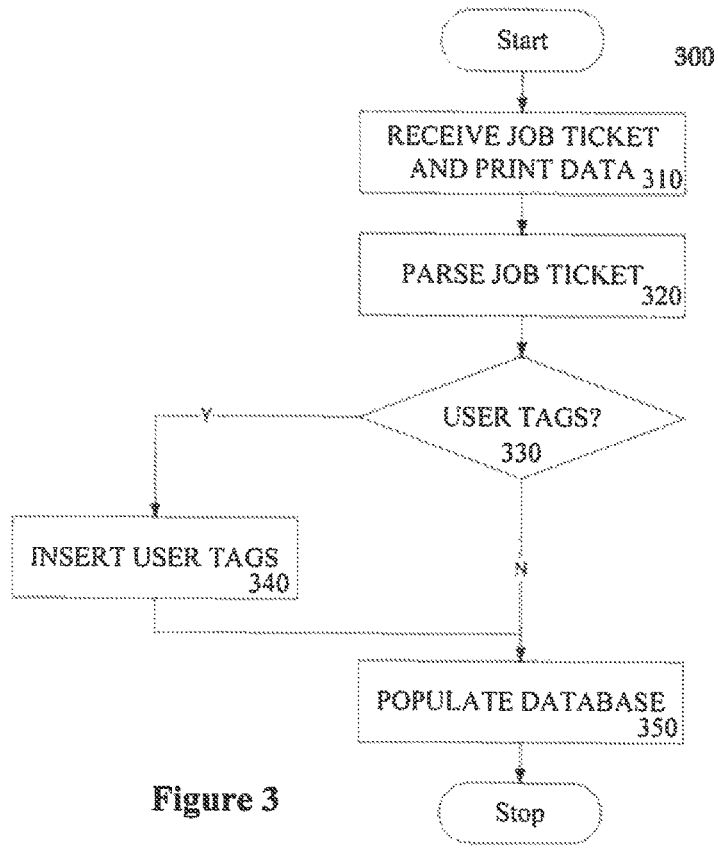
FIG. 3 is a flow diagram illustrating one embodiment of a process for generating tags.

FIG. 3 is a flow diagram illustrating one embodiment of a method 300 for generating tags based on test cases. Method 300 may be performed by processing logic that may comprise hardware (e.g., circuitry, dedicated logic, programmable logic, etc.), software (such as instructions run on a processing device), or a combination thereof. In one embodiment, method 300 may be performed by tag generation logic 230. The processes of method 300 are illustrated in linear sequences for brevity and clarity in presentation; however, it is contemplated that any number of them can be performed in parallel, asynchronously, or in different orders.

At processing block 310, a JDF job ticket and PDF print data are received as test cases. At processing block 320, the job ticket is parsed for tag information. In one embodiment, a set of attribute tags is generated when the JDF is parsed, where each attribute describes a property of the corresponding print job. At decision block 330, a determination is made as to whether a user has chosen to provide additional tags via GUI 205. If so, the additional tags are inserted, processing block 340. In either event a database 242 is populated with test case tag information and corresponding test cases, processing block 350.

Figure 4:
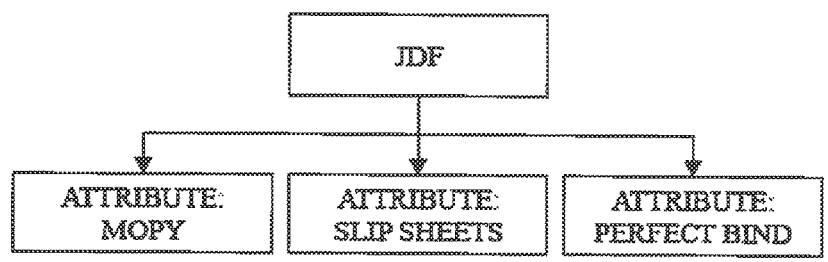
FIG. 4 illustrates one embodiment of attribute tags generated from a test case.

FIG. 4 illustrates one embodiment of attribute tags (e.g. test case tags) generated from a test case. As shown in FIG. 4, the tags are generated that correspond to attributes (e.g., mopy, Slip Sheets and Perfect Bind) in the JDF job ticket. According to one embodiment, each tag and corresponding test case may include an execution scenario (e.g., re-preflight).

Referring back to FIG. 2, test suite generation logic 240 parses change code information received from code profile 220 to dynamically generate a test suite based on attribute data (or metadata) included in the change code information. Accordingly, test suite generation logic 240 includes test case selection logic 243 and parser 244.

In one embodiment, test case selection logic 243 detects an occurrence of a code changes in received code change information. Subsequently, test case selection logic 243 selects one or more test cases stored in database 242 to test detected code changes. According to one embodiment, test case selection logic 243 may select one or more test cases to test for simple keyword matching. In such an embodiment, test cases may match keywords corresponding to generated attribute tags. For instance, a test case may match attributes in the code corresponding to the tags generated from the JDF parsing (e.g., the mopy, Slip Sheets and Perfect Bind attribute tags discussed with reference to FIG. 4).

In other embodiments, test case selection logic 243 may select test cases based on one or more of a user selected confidence level (e.g., 70%), a user selected time period (e.g., testing to be completed within one hour), tests appropriate for a target printer (e.g., select color jobs for a color printer, but no color jobs for a monochrome printer), and tests appropriate for all areas affected by a code change (e.g., link scope of the changed code module to the scope of the test cases).

In further embodiments, test case selection logic 243 may select test cases that broaden testing for broadly stated requirements (e.g., test all paper trays unless a user specifies a subset of trays), order selected test cases to minimize run time (e.g., order test cases with consideration of used resources), or perform a regression test including a known test case having a failure being corrected.

Parser 244 parses code change information and corresponding issue information in order to acquire attribute data for suggested changes. Further, parser 244 dynamically generates a test suite based on the acquired tags. FIG. 5A illustrates one embodiment of code change information. In the scenario shown in FIG. 5A, a developer forgot to return a false in the event that there were less than 50 sheets in a job, and subsequently made the change.

The line that begins with a + is a new line added to the code, while the @tags section describes the tags associated with that function. In one embodiment, the @tags section is an optional line in the code that can be specified at a function level, class level, file level, or even externally by the user. When the developer commits this change, parser 244 determines where the code change occurred and adds the test cases associated with that function, class, file, or code module to the test suite. In this embodiment, the additional line will cause the "Staple" and "Thickness" tags to be added to the list of parsed tags.

FIG. 5B illustrates one embodiment of parsing issue information generated by parser 244. Specifically, FIG. 5B shows an embodiment of a "recreate scenario" in the issue information. In one embodiment, parser 244 parses the issue description by acquiring the attribute data (e.g., "perfect bind" or "perfect binding" to generate tags (e.g., "Perfect Bind", "Staple", "Weight 5", Printed Cover"). Subsequently, parser 244 generates a suggested test suite and a set of attribute tags for testing based on selected test cases.

Figure 7:
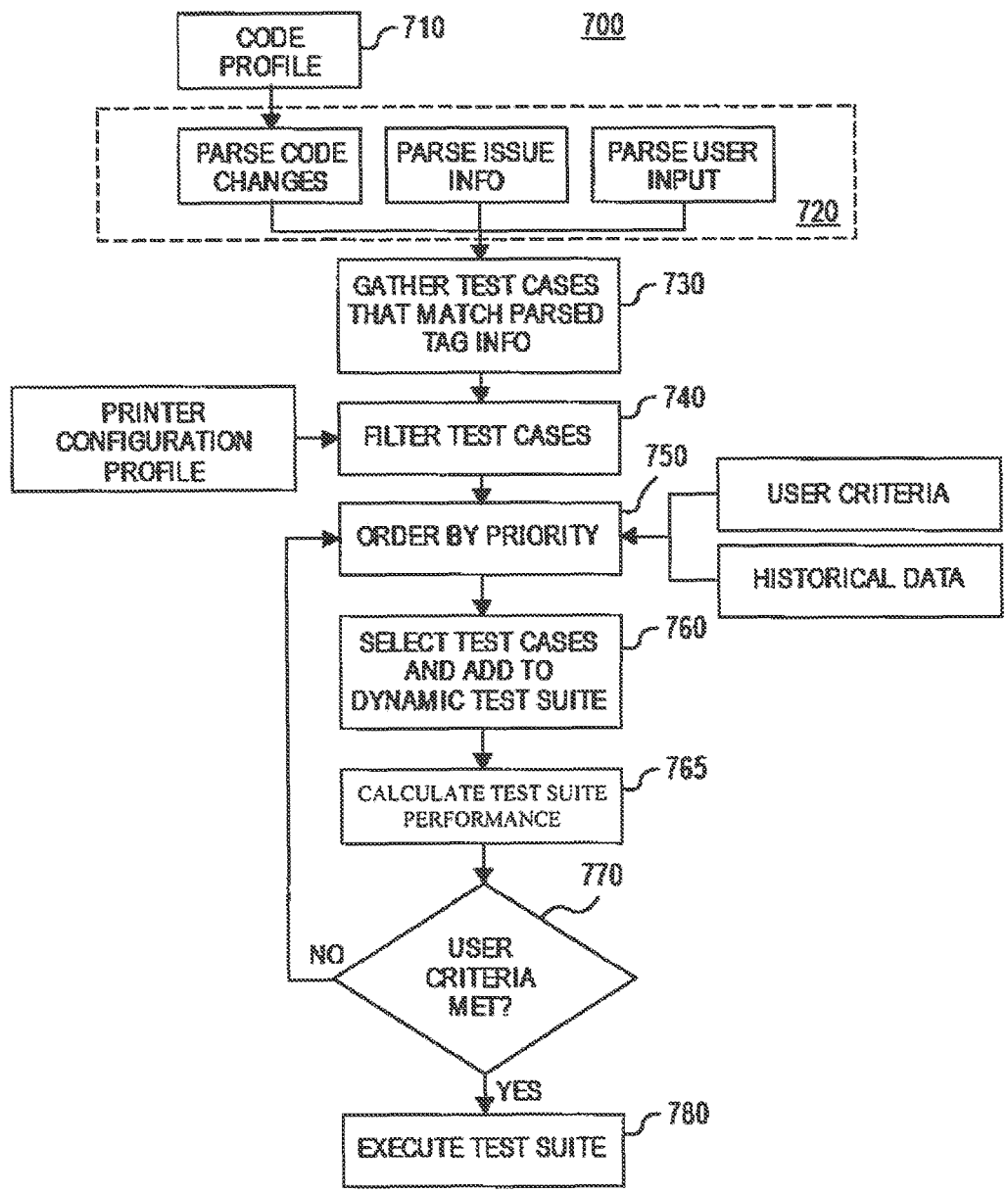
FIG. 7 is a flow diagram illustrating one embodiment of a test suite generation process.

FIG. 7 is a flow diagram illustrating one embodiment of a method 700 for generating a test suite. Method 700 may be performed by processing logic that may comprise hardware (e.g., circuitry, dedicated logic, programmable logic, etc.), software (such as instructions run on a processing device), or a combination thereof. In one embodiment, method 700 may be performed by test suite generation logic 240. The processes of method 700 are illustrated in linear sequences for brevity and clarity in presentation; however, it is contemplated that any number of them can be performed in parallel, asynchronously, or in different orders.

At processing block 710, code change information is matched against a persistent code profile. At processing block 720, parser 244 parses the input information, for instance code change and corresponding issue information as well as user input received via GUI 205 (e.g., user selected tag information, if applicable) to produce parsed tag information. In a further embodiment, parser 244 uses the code profile 710 to determine how to parse the code changes.

At processing block 730, test cases are gathered from a pool of pre-defined test cases with test case tag information that match the parsed tag information. The test cases may additionally include historical data. In such an embodiment, a list of all of the test cases that match the parsed tag information is generated. At processing block 740, the gathered test cases are filtered according to the printer configuration profile 210 and the gathered tag information to determine valid test cases.

At processing block 750, the filtered test cases are ordered into an ordered list based on user criteria received at GUI 205 and/or historical data. In one embodiment, user criteria includes factors discussed above (e.g., confidence level, total execution time, etc.) and historical data is data associated with each test case that includes information (e.g., about whether the test case aborted previously, how long the test case takes to print, the printer configuration requirements, etc.). Further, the order of the test cases takes into account the test cases that have already been added to the test suite, potentially diminishing test effectiveness returns on similar test case print jobs, current estimated duration, etc.

In one embodiment, confidence level user criteria refers to a test effectiveness percentage confidence (e.g., 70%) of associated test cases that are run, which are randomly selected from gathered test cases. In another embodiment, the percentage confidence level refers to gather test cases associated with issue and code changes. Accordingly, historical data may be used to provide a weighted priority value for each test case. Further, when adding test cases to the test suite, additional test cases with the same matching tag values have diminishing returns. As a result, a 70% confidence level may only utilize 20-30% of the total test cases gathered, but will still produce all of the potential errors produced by a code change approximately 70% of the time. In one embodiment, execution time for a test suite may be calculated as the sum of the individual execution times of the test cases contained in the test suite plus corresponding printer configuration change times.

At processing block 760, test cases are selected from the ordered test cases and added to the dynamic test suite while maintaining the order. At processing block 765, the test suite performance is calculated for the user criteria. The calculations may be performed as discussed above. At decision block 770, a determination is made as to whether user criteria have been met. Thus, a determination is made as to whether confidence level, total execution time and/or other criteria have been met. If no user criteria have been specified, a determination is made as to whether all of the test cases have been added to the test suite.

If at decision block 770 there is a determination that the user criteria has not been met, control is returned to processing block 750 where the filtered test cases are again ordered (e.g. reordered) by priority. Otherwise, the test suite is executed, processing block 780. In one embodiment, test driver 250 (FIG. 2) executes the test suites received from test case selection logic 243. In execution embodiments, tag generation may have been performed for several hundred test case print jobs prior to defining a test suite by selecting the appropriate tags. Typically, each test case defines its own printer configuration requirements information, execution scenario and media requirements. As a result, printing system configuration may need to be changed many times, which can be exceedingly time-consuming time. The time needed to change printing system configurations may be due to printer system 100 restarts or manual intervention. Printer configuration changes during an executed test suite may be minimized by reordering the test case execution order within the test suite.

According to one embodiment, processing block 750 (or alternatively test driver 250) orders or reorders received test cases based on priority and configuration requirements. FIG. 6 illustrates one embodiment of reordering job execution order performed by processing block 750. As shown in FIG. 6, jobs are initially ordered only based on test priority (e.g. Test Cases 1-5.). However in this order there are four configuration changes, with each change taking approximately one minute.

In one embodiment, processing block 750 (or alternatively test driver 250) orders or reorders the execution of the test cases to maintain test priority (e.g. 1→2→3, etc.), while consecutively executing test cases having identical configuration information. For example, Test Case 4 is executed consecutively with Test Case 1 and Test Case 5 is executed consecutively with Test Case 2 since they share configuration 1 and configuration 2, respectively. Thus, the reordered execution order saves two configuration changes (e.g., from 4 configurations changes to two configurations changes), resulting in the saving of approximately two 2 minutes of execution time. After test case execution a user may analyze the output via GUI 205.

Figure 8:
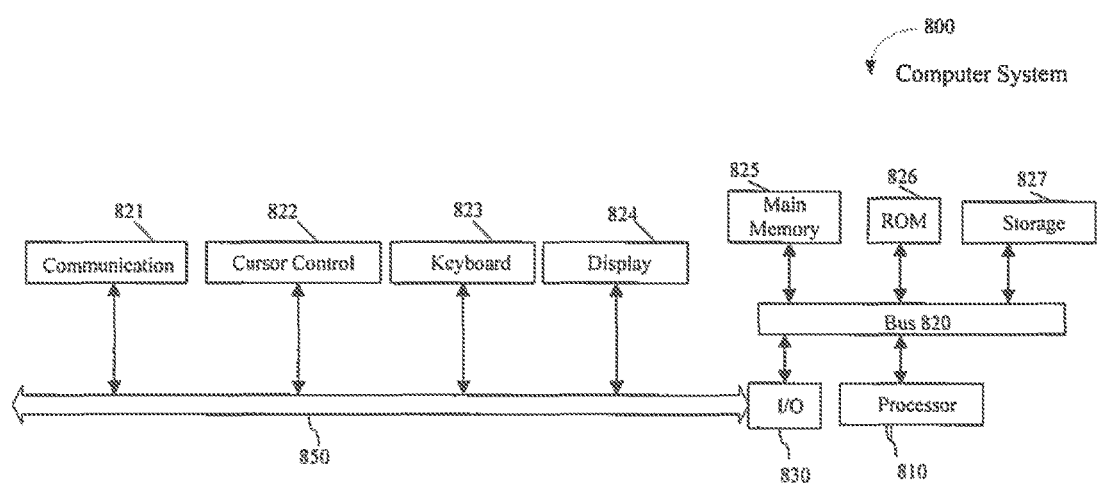
FIG. 8 illustrates one embodiment of a computer system.

FIG. 8 illustrates a computer system 800 on which printing system 100 may be implemented. Computer system 800 includes a system bus 820 for communicating information, and a processor 810 coupled to bus 820 for processing information.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., an alphanumeric input device 823 and or a cursor control device 822). The communication device 821 is for accessing other computers (servers or clients). The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components. The term "logic" may include, by way of example, software or hardware and/or combinations of software and hardware.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printer test system comprising:
   a memory to store:
      tag generation logic;
      test suite generation logic; and
      a test driver; and
   a processor to execute:
      the tag generation logic to receive print job data as a test case, and parse the print job data to generate a set of test case tags that describe attributes of the print job data to be included in the test case and store the set of test case tags and the test case;
      the test suite generation logic to receive input information, and dynamically generate a test suite of one or more test cases to test a printing system based on input attributes included in the input information, wherein the input information comprises code change information; and
      the test driver to execute a test suite.

2. The system of claim 1, wherein the test suite generation logic comprises test case selection logic to select one or more test cases to test one or more attributes indicated in the input information.

3. The system of claim 2, wherein the test suite generation logic further comprises a parser to parse the input information to acquire the input attributes included in the input information.

4. The system of claim 1, wherein the input information further comprises at least one of: issue information and user input information.

5. The system of claim 3, wherein the test case selection logic gathers one or more test cases based on a match between input attributes included in the input information and a tag within the set of tags corresponding to the one or more test cases.

6. The system of claim 5, wherein the test case selection logic filters the test cases to determine valid test cases.

7. The system of claim 6, wherein the test case selection logic orders the test cases into an ordered list based on a priority.

8. The system of claim 7, wherein the priority of the ordered list is based upon user criteria.

9. The system of claim 8, wherein the user criteria comprises at least one or more of: a user selected confidence level and a user selected execution time period.

10. The system of claim 8, wherein the test case selection logic generates the test suite based on the priority of the ordered list.

11. The system of claim 10, wherein the test case selection logic determines whether the user criteria has been met prior to execution of the test suite.

12. The system of claim 1, wherein the test case comprises:
   a job ticket; and
   a page description language (PDL) datastream.

13. The system of claim 12, wherein the tag generation logic parses the job ticket to generate a set of tags and store the test case and the set of tags.

14. The system of claim 1, wherein the test case selection logic reorders the test cases in the test suite prior to execution of the test suite.

15. The system of claim 14, wherein the test case selection logic reorders the test cases in the test suite to maintain test priority and consecutively execute test cases having identical configuration information.

* * * * *